INVENTOR.
CHARLES E. HURLBURT
BY
AGENT

INVENTOR.
CHARLES E. HURLBURT

INVENTOR.
CHARLES E. HURLBURT
BY
AGENT

# United States Patent Office 3,483,760
Patented Dec. 16, 1969

3,483,760
APPARATUS AND METHOD FOR CANCELLATION OF SPRING RATE IN GYROSCOPE WITH FLEXURAL SUPPORT
Charles E. Hurlburt, River Edge, N.J., assignor to The Bendix Corporation, a corporation of Delaware
Filed Aug. 14, 1967, Ser. No. 660,268
Int. Cl. G01c 19/02
U.S. Cl. 74—5                                                         6 Claims

ABSTRACT OF THE DISCLOSURE

Apparatus and method for counteracting restraining torque about the precession axes of a gyroscope caused by flexural pivots used for supporting the gyro gimbals and by associated mechanical and electrical restraints. The gyroscope is rotated in a direction and sense to maintain any precession torque equal and opposite to the restraining torque.

BACKGROUND OF THE INVENTION

Field of the invention

This invention relates to gyroscopes and, more particularly, to closed loop stabilized gyroscopes supported by flexural pivots about the precession axes.

Cross references to related patents

The present invention uses flexural pivots of the type disclosed in U.S. Patent No. 3,073,584 issued Jan. 15, 1963, to H. Troeger and in U.S. Patent No. 3,132,315 issued May 5, 1964, to F. H. S. Rossire, both of which patents are assigned to The Bendix Corporation, assignee of the present invention.

DESCRIPTION OF THE PRIOR ART

Flexural pivots of the type disclosed in the aforenoted U.S. Patents Nos. 3,073,584 and 3,132,315 are used in place of ball bearings for supporting gyro gimbals. Although flexural pivots have many advantages among which are simple construction and the capability of withstanding loads in any direction, they have the disadvantage of developing restraining torques when deflected which add to inherent restraining torques caused by leads to electrical pickoffs and torquers and various electrical sources. Prior to the present invention different types of electrical and mechanical devices have been provided to counteract this restraining torque, thus adding to the complexity of the gyro assembly.

SUMMARY OF THE INVENTION

The present invention contemplates a gyroscope including a rotor mounted on a gimbal and which gimbal is supported by flexural pivots for providing a predetermined degree of angular freedom about the gimbal axis. The gyroscope is rotated in a direction opposite to the spin of the rotor and about an axis coincident with the spin axis for providing a torque about the precession axis of the gyroscope and which precession torque is equal in magnitude and in a sense opposite to the restraining torque for counteracting said restraining torque and thereby effectively preventing gyroscopic precession.

One object of this invention is to provide apparatus for counteracting the restraining torque developed by flexural pivots which support a gimbal of a gyroscope along a precession axis.

Another object of this invention is to provide a two degree of freedom gyroscope having flexural pivots extending along two orthogonal precession axes and to provide a method to cancel the restraining torque of the flexural pivots about the precession axes.

Another object of this invention is to provide a plurality of single degree of freedom gyroscopes mounted by flexural pivots along the precession axes thereof and a method to counteract the various undesirable electrical and mechanical restraining torques of the gyroscope about the precession axes.

Another object of this invention is to provide a gyroscope mounted along a precession axis by flexural pivots and a method to cancel precession torques caused by opposing torque restraints of the flexural pivots and restraints from other electrical and mechanical sources about the precession axis.

These and other objects and features of the invention are pointed out in the following description in terms of the embodiments thereof which are shown in the accompanying drawings. It is to be understood, however, that the drawings are for the purpose of illustration only and are not a definition of the limits of the invention, reference being had to the appended claims for this purpose.

DESCRIPTION OF THE INVENTION

First embodiment

Figure 1:
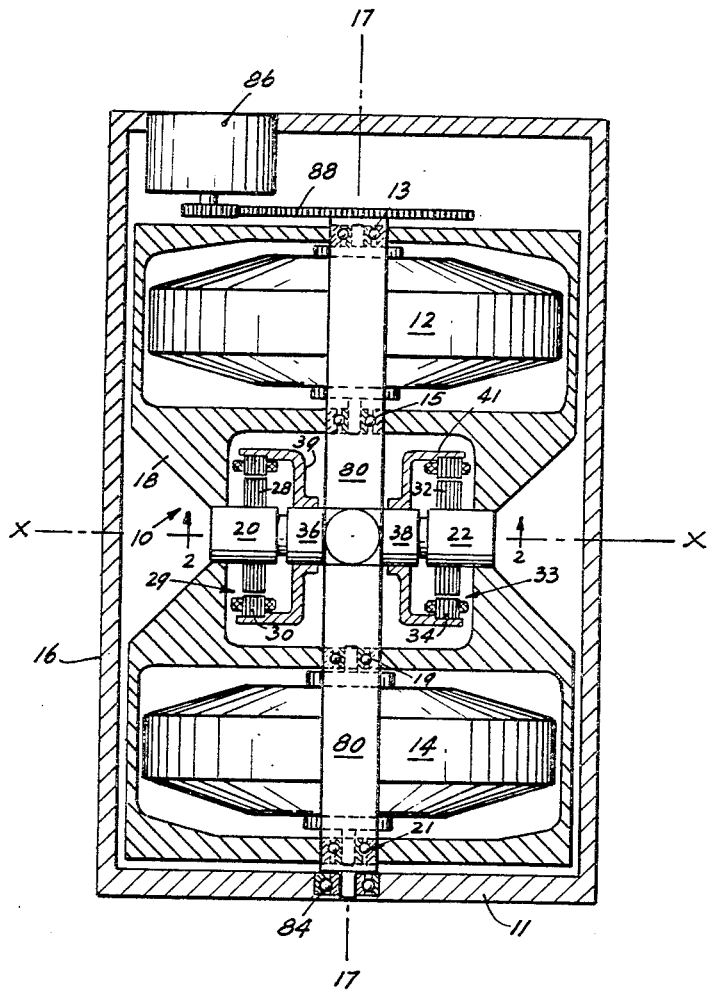
FIGURE 1 is a top plan view and elevation of a gyroscope assembly embodying the invention for measurement of input torques about multiple axes.
Figure 2:
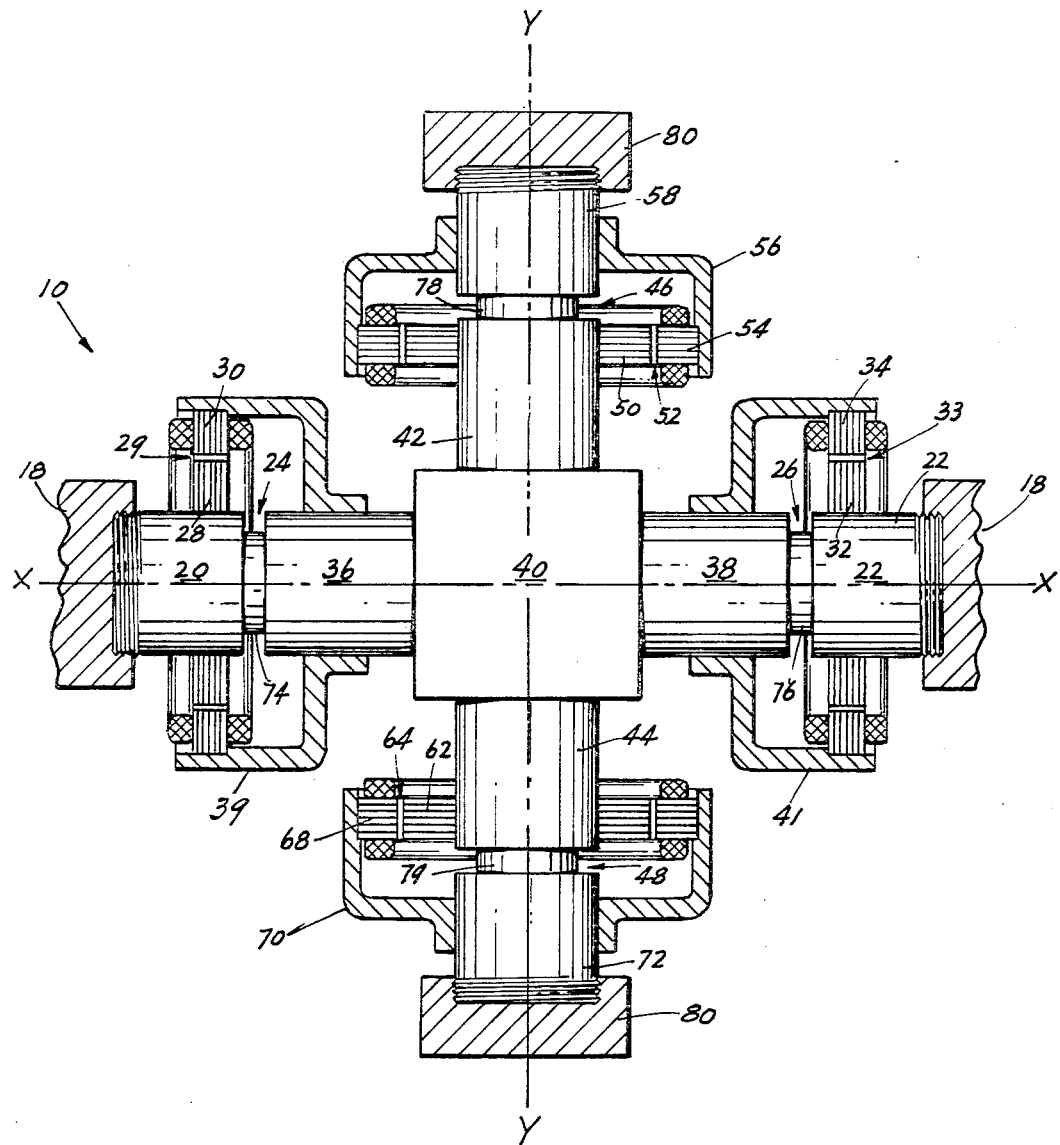
FIGURE 2 is an enlarged sectional view taken along the line 2—2 of FIGURE 1 and looking in the direction shown by the arrows to particularly show the support function of the flexural pivots mounted along two orthogonal gimbal axes.

Referring to FIGURE 1, there is shown a first embodiment of the invention wherein a casing 16 surrounds a gyroscope assembly 10, and which gyroscope assembly 10 has two rotors 12 and 14 journaled in bearings 13 and 15 and beairngs 19 and 21, respectively, for rotation about a reference axis 17. The bearings 13 and 15 and the bearings 19 and 21 support the rotors 12 and 14 in an inner gimbal 18 which, as best shown by FIGURE 2, is pivotally supported by end elements 20 and 22 of flexural pivots 24 and 26. The flexural pivots 24 and 26 are of the type described in the aforementioned U.S. Patents Nos. 3,073,584 and 3,132,315.

A rotor element 28 of a conventional type electrical pickoff 29 having a stator element 30 is mounted to the end element 20 of the flexural pivot 24. The pickoff 29 provides an electrical signal corresponding to angular displacement of the rotor element 28.

A rotor element 32 of a conventional type torquer motor 33 having a stator element 34 is mounted to the end element 22 of the flexural pivot 26. The torquer motor 33 torques gimbal 18 about the X—X axis shown in FIGURES 1 and 2 upon an electrical signal being applied in a conventional manner to the windings of stator 34.

Stator 30 of pickoff 29 is secured in a support 39 surrounding an end element 36 of flexural pivot 24 and stator 34 of torquer 33 is secured in a support 41 surrounding an end element 38 of flexural pivot 26. The end elements 36 and 38 are fixedly mounted to a center block 40, and to which center block 40 are also mounted end elements 42 and 44 of flexural pivots 46 and 48, respectively. Flexural pivots 46 and 48 are disposed about an axis Y—Y, and which axis Y—Y is orthogonal to axis X—X as best shown in FIGURE 2.

A rotor elements 50 of a conventional type pickoff 52 having a stator element 54 is mounted to the end element 42. Stator 54 of pickoff 52 is secured in a support 56 surrounding an end element 58 of flexural pivot 46. The pickoff 52 provides an electrical signal corresponding to angular displacement of the rotor 50. A rotor element 62 of a conventional type torquer motor 64 having a stator element 68 is mounted to the end element 44. Stator 68 or torquer 64 is secured in a support 70 surrounding an end element 72 of flexural pivot 48. Torquer motor 64 is effective upon an electrical signal being applied thereto to cause rotational movement of rotor 62 about the Y—Y axis.

The end elements 20, 22, 42 and 44 are pivotally connected to end elements 36, 38, 58 and 72 by the spring elements of the flexural pivots 24, 26, 46 and 48, and which spring elements are generally indicated by the numerals 74, 76, 78 and 79, respectively. The end elements 58 and 72 of the flexural pivots 46 and 48, disposed about the Y—Y axis as hereto fore noted, are mounted to an outer gimbal 80 to permit angular movement of inner gimbal 18 relative to outer gimbal 80 about the Y—Y axis. The outer gimbal 80, as shown by FIGURE 1, is journaled in the casing 16 at one end thereof by a bearing 84 for rotation about the reference axis 17. The outer gimbal 80 is connected at the other end through a gear train 88 to a motor 86 so that outer gimbal 80 and all elements supported thereby are rotated about an axis coincident with reference axis 17 when no torque is applied to casing 16.

Second embodiment

Figure 3:
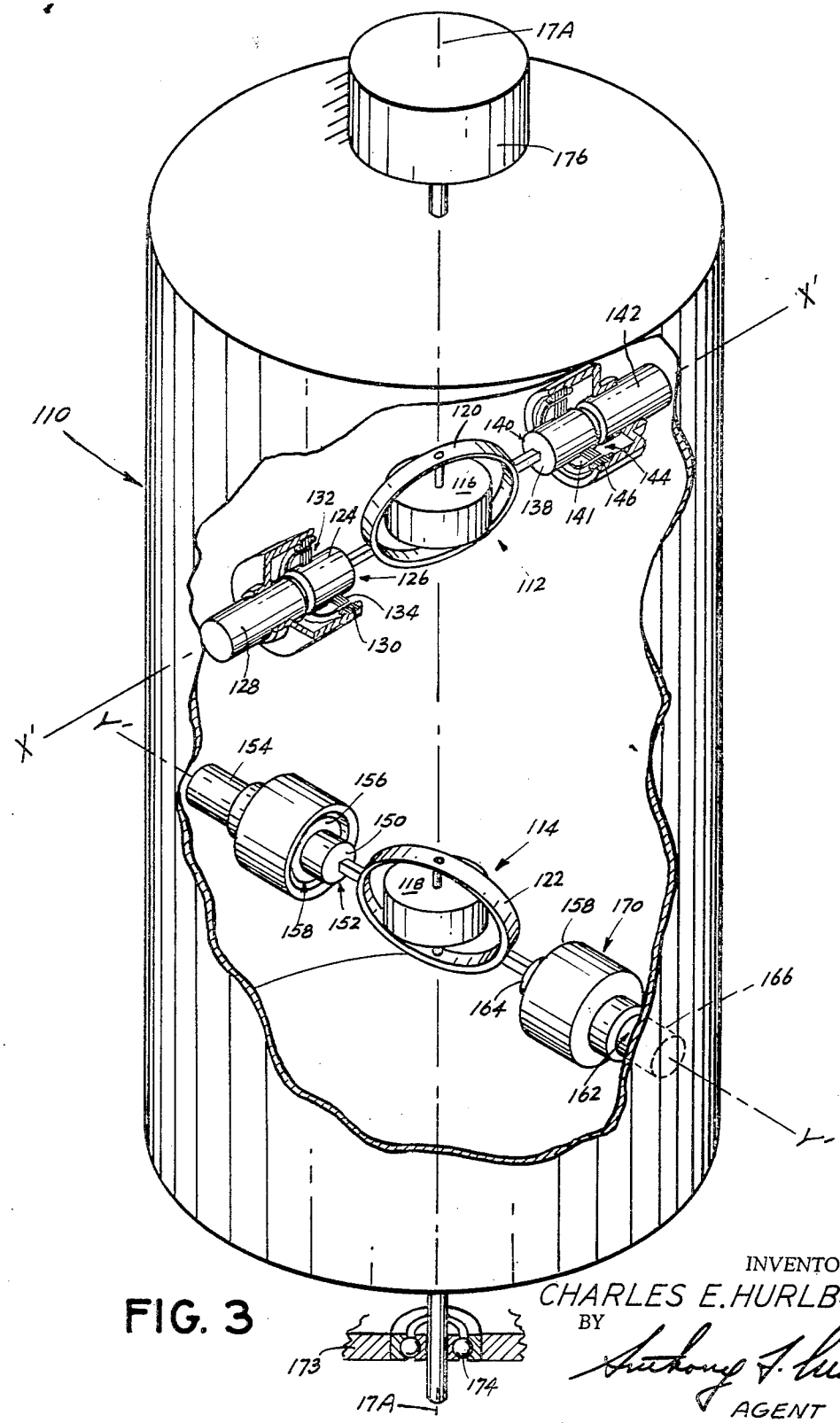
FIGURE 3 is a second embodiment of the invention showing a perspective view of two single degree of freedom gyroscopes having input axes orthogonal to each other and a coincident spin reference axis.

Referring to FIGURE 3, a second embodiment of the invention is shown wherein a casing 110 surrounds a pair of single degree of freedom gyroscopes, and which gyroscopes are generally indicated by the numerals 112 and 114 having rotors 116 and 118 mounted to gimbals 120 and 122, respectively, for rotation about a reference axis 17A.

An end element 124 of a flexural pivot 126 is secured to gimbal 120 extending from one end thereof to permit angular displacement of end element 124 about an output axis X'—X' relative to an end element 128 of pivot 126 and which end element 128 is secured to casing 110. A stator element 130 of a conventional type torquer motor 132 is fixedly mounted in relation to end element 128 of flexural pivot 126 and a rotor element 134 of torquer 132 is mounted to end element 124 of flexural pivot 126. Torquer motor 132 torques gimbal 120 about the X'—X' axis upon an electrical signal being applied thereto in conventional manner.

An end element 138 of a flexural pivot 140 is secured to gimbal 120 extending from the other end thereof to permit angular movement of end element 138 about the X'—X' axis relative to an end element 142 of flexural pivot 140, and which end element 142 is secured to casing 110. A rotor element 141 of a conventional type pickoff 144 having a stator element 146 is mounted to end element 138. Stator 146 is fixedly mounted in relation to end element 142 of flexural pivot 140. The pickoff 144 provides an electrical signal corresponding to angular displacement of rotor element 141.

An end element 150 of flexural pivot 152 is secured to gimbal 122 extending from one end thereof to permit angular displacement of gimbal 122 an axis Y'—Y' relative to and end element 154 of the pivot 152, and which end element 154 is secured to casing 110. A rotor element 156 of a conventional type torquer motor 158 having a stator element (not shown) is mounted to an end element 150. The stator element of torquer motor 158 is fixedly mounted in relation to the end element 154 in the manner similar to the mounting of stator 130 of torquer motor 132 in fixed relation with respect to element 128 of flexural pivot 126. The torquer motor 158 torques gimbal 122 about the Y'—Y' axis upon an electrical signal being applied thereto in conventional manner.

An end element 164 of flexural pivot 162 is secured to gimbal 122 extending from the other end thereof to permit angular displacement of gimbal 122 about the Y'—Y' axis relative to an end element 166 of pivot 162 and which end element 166 is secured to casing 110. A rotor element (not shown) of a conventional type pickoff 170 having a stator element (not shown) is mounted to end element 164. The rotor and stator of the pickoff 170 are similar to the rotor 141 and the stator 146, respectively, of the pickoff 144. The stator of pickoff 170 is fixedly mounted in relation to end element 166 and pickoff 170 provides an electrical signal corresponding to the angular displacement of the rotor element thereof.

Casing 110 is jouraled in a frame 173, which may represent a platform of a flight vehicle, by a bearing 174 and is driven by motor 176 about an axis coincident with the reference axis 17A of gyroscopes 112 and 114.

OPERATION

Referring to the first embodiment of the invention as shown in FIGURES 1 and 2, the rotors 12 and 14 are driven about the reference axis 17 by suitable means such as an alternating current motor (not shown). The outer gimbal 80 journaled in the casing 16 is similarly driven about the axis coincident with the reference axis 17, but in a direction opposite to the direction of rotation of the rotors 12 and 14 as is the gyroscope assembly 10 including the rotors 12 and 14 mounted to the inner gimbal 18. In this connection it is to be noted that a fundamental gyro law states that if a gyroscope is rotated about an axis about which spinning of the gyro rotor is prevented, the gyro axle tends to set itself parallel to the axis of rotation with the spin of the gyro rotor in the same sense as the rotation of the gyroscope. Thus, when the casing 16 surrounding the gyroscope assembly 10, as shown by FIGURE 1, is displaced about the Y—Y axis shown by FIGURE 2, for example, the spin axis of the rotors 12 and 14 will tend to align with the Y—Y axis to cause precession of the inner gimbal 18 about the X—X axis.

Similarly, if the casing 16 is displaced about the X—X axis, the spin axes of rotors 12 and 14, in accordance with the aforementioned gyroscopic phenomenon, will tend to align with the axis X—X. The precession of the inner gimbal 18 about the mutually perpendicular axes X—X, Y—Y, and both of which axes are perpendicular to the reference axis 17, is resisted by the spring elements 74, 76, 78 and 79 of the flexural pivots 24, 26, 46 and 48, respectively. Additional resistance is provided by the mechanical connections to torquers 33 and 64 and pickoffs 29 and 52 as well as by magnetic interaction between these components. It is thus obvious that the outer gimbal 80 supported to rotate about the reference axis 17 but in a sense opposite to the spin of rotors 12 and 14 is in a state of unstable equilibrium. The casing 16, displaced a finite angle θ, causes a torque to be developed which displaces the rotor spin axis from coincidence with reference axis 17 to a new position. The equation for the torque T is as follows:

$$T = \sin\theta \omega H \qquad (1)$$

where ω is the speed of rotation of the outer gimbal 80 and the gyroscope assembly 10 therein, and H is the sum of angular momentum of the rotors 12 and 14. In attaining the new spin axis, displacement of the inner gimbal 18 is opposed by the spring members 74, 76, 78 and 79 of the flexural pivots 24, 26, 46 and 48, respectively, along the two axes X—X and Y—Y. About any axis, the opposition to the aforementioned displacement is as follows:

$$T_1 = \theta K \qquad (2)$$

where $T_1$ is a torque in opposition to T, θ is the angle of displacement about the Y—Y axis of the end elements 42 and 44 relative to the end elements 58 and 72, or along the X—X axis of the end elements 20 and 22 with respect to the end elements 36 and 38, and K is a constant which is the effective static restraint to movement of the inner gimbal 18 about the axes X—X or Y—Y per unit degree of movement which may be predetermined for the system. For cancellation of the restraining torque, T must equal $T_1$ and the following condition must exist:

$$\sin \theta \omega H = \theta K \quad (3)$$

For small angles of displacement of the casing 18, the sine of $\theta$ equals $\theta$. Therefore for a first order of approximation $$\omega H = K \text{ or } \omega = K/H \quad (4)$$

The assembly so rotated at the determined $\omega$ will have essentially a frictionless pivot wherein motion of the inner gimbal 18 about either output axis X—X or Y—Y is restrained since the torque tending to cause precession is substantially equal but opposite in sense to the effective restraint of the flexural pivots 24, 26, 46 and 48, conductors and other sundry restraints.

Referring to the second embodiment of the invention as shown in FIGURE 3, rotors 116 and 118 of gyros 112 and 114 respectively are mounted in gimbals 120 and 122 for rotation about spin reference axis 17A. The rotors 116 and 118 may be driven in conventional manner, as for example, by an electromagnetic field produced from a motor (not shown). The output axes X'—X' and Y'—Y' of the gyros 112 and 114 being orthogonal one to the other, precession of the gyro 112 is caused by torque being applied to the casing 110 and frame 173 about an axis parallel to the Y'—Y' axis and perpendicular to axes X'—X' and 17A while precession of gyro 114 is caused by torque applied to casing 110 and frame 173 about an axis parallel to the X'—X' axis and perpendicular to axes Y'—Y' and 17A. That is, the gyros 112 and 114 have orthogonal input axes and output axes although the reference axis 17A of each is the same.

The torque restraint, due to flexural pivot restraint, leads and conductors, etc. is measured along the output axes X'—X' and Y'—Y' for angular movement of the gimbals 120 and 122 respectively thereabout. In particular, the torque restraint to movement about the output axis of each gyro is $T_1 = \theta K$ where $\theta$ is the angle of displacement of the gimbals 120 and 122 about the axes X'—X' and Y'—Y', respectively, measured from the position at which the spin axis of each is aligned with the reference axis 17A and K is the restraint per unit of angle due to mechanical lead restraints, electrical restraints from various sources and the spring restraint of the flexural pivots 126 and 140 along the X'—X' axis when arcuate ends 124 and 138 pivot with respect to arcuate ends 128 and 142 and of flexural pivots 152 and 162 along the Y'—Y' axis when end elements 150 and 164 pivot with respect to end elements 154 and 166.

The casing 110 is rotated about the axis coincident with the reference axis 17A, but in an opposite sense so that upon a displacement of the case a finite angle $\theta$ about an input axis, the torque developed about the respective output axis X'—X' or Y'—Y' of the gyros 112 and 114 tending to drive the spin axis from coincidence with the reference axis 17A is $T = \sin \theta \omega H$ where $\theta$ is the angle of displacement of the casing 110 and frame 173, $\omega$ is the speed of counter rotation of the casing 110 with respect to frame 173 and H is the angular momentum of each rotor 112 and 114 and T is a torque in opposition to $T_1$.

As also stated with regard to FIGURES 1 and 2, for cancellation of the restraining torque $T_1$ about the axes X'—X' and Y'—Y', the following condition must exist:

$$T = T_1$$
$$\sin \theta \omega H = \theta K$$

and for small angles:

$$\sin \theta = \theta$$

and for first order approximation $$\omega H = K \text{ or } \omega = K/H$$

and an assembly so rotated has effectively frictionless pivots.

While two embodiments of the invention have been illustrated and described, various changes in the form and relative arrangements of the parts, which will now appear to those skilled in the art may be made without departing from the scope of the invention. Reference is, therefore, to be had to the appended claims for a definition of the limits of the invention.

What is claimed is:

1. A gyroscopic device comprising:
    a rotor having a spin axis;
    a gimbal supporting the rotor for rotation about the spin axis;
    a pair of flexural pivots mounting the gimbal for pivotal movement about an axis perpendicular to the spin axis of the rotor;
    means for supporting the flexural pivots; and
    means for rotating the support means about an axis coincident with the spin axis of the rotor and in a sense opposite to the rotation of the rotor so as to provide a torque for counteracting the restraining torque about the axis perpendicular to the spin axis of the rotor when the pivots are deflected, the counteracting torque corresponding to the product of the angular speed of the support means and the angular momentum of the rotor.

2. A gyroscopic device as described by claim 1, comprising:
    another rotor supported by the gimbal for rotation about the spin axis;
    the support means including another pair of flexural pivots secured to the first mentioned pair of flexural pivots and defining an axis perpendicular to both the spin axis and the axis perpendicular thereto and an outer gimbal supporting the other pair of flexural pivots.

3. A gyroscopic device as described by claim 1, comprising:
    another rotor;
    another gimbal for supporting the other rotor for rotation about the spin axis;
    another pair of flexural pivots secured to the support means and mounted to the other gimbal on opposite ends thereof for pivoting the gimbal about an axis perpendicular to both the spin axis and the axis perpendicular thereto; and
    the restraining torque about said last mentioned axis being effectively cancelled upon deflection of the other flexural pivots when the product of the angular speed of the support means and the angular momentum of the other rotor is substantially equal to the restraining torque.

4. Apparatus for cancelling the restraining torque about mutually perpendicular precession axes of a multiple degree of freedom gyroscope having a pair of rotors supported by a gimbal for rotation about an axis perpendicular to the precession axes, the apparatus comprising:
    a first pair of flexural pivots supporting the gimbal about one precession axis;
    a second pair of flexural pivots secured to the first pair of flexural pivots and defining the other precession axis;
    means for supporting the second pair of flexural pivots; and
    means for rotating the support means about an axis coincident with the rotor spin axis and in a sense opposite to the rotation of the rotors so that the product of angular speed of the support means and the angular momentum of the rotors is substantially equal to the restraining torque developed about the precession axes when said first and second pairs of flexural pivots are deflected.

5. A method for cancelling restraining torque about the precesion axis of a gyroscope having flexural pivots supporting a gimbal and a rotor supported by the gimbal, the steps comprising:
  (a) rotating the rotor about its spin axis;
  (b) torquing the gyroscope about an input axis perpendicular to the spin axis for causing a precession torque about an output axis perpendicular to both the input axis and the spin axis;
  (c) rotating the gyroscope about an axis coincident with the spin axis and in a sense opposite to the rotation of the rotor until precessional motion about the output axis is prevented.

6. A method described by claim 5 including:
  prior to the step of rotating the rotor about its spin axis, determining the restraining torque per unit of angular displacement of the gimbal about the output axis; and
  rotating the gyroscope about an axis coincident with the spin axis so that the product of the angular speed of the gyroscope and the angular momentum of the rotor is substantially equal to the determined restraining torque.

References Cited

UNITED STATES PATENTS

| | | | |
|---|---|---|---|
| 3,192,778 | 7/1965 | Ephgrave | 74—5 XR |
| 3,211,011 | 10/1965 | Litty | 74—5 |
| 3,264,880 | 8/1966 | Fischel | 74—5 |
| 3,290,949 | 12/1966 | Samet | 74—5 |
| 3,315,533 | 4/1967 | Litty | 74—5 |
| 3,301,073 | 1/1967 | Howe | 74—5 XR |

FRED C. MATTERN, JR., Primary Examiner

M. ANTONAKAS, Assistant Examiner

U.S. Cl. X.R.

74—534